United States Patent
Fowe et al.

(10) Patent No.: US 9,640,071 B2
(45) Date of Patent: May 2, 2017

(54) METHOD AND APPARATUS FOR IDENTIFYING A BI-MODALITY CONDITION UPSTREAM OF DIVERGING ROAD SEGMENTS

(71) Applicant: HERE Global B.V., Veldhoven (NL)

(72) Inventors: James Fowe, Chicago, IL (US); Piotr Knap, Chicago, IL (US); Indu Kodali, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/755,927

(22) Filed: Jun. 30, 2015

(65) Prior Publication Data

US 2017/0004705 A1    Jan. 5, 2017

(51) Int. Cl.
  *G08G 1/01*    (2006.01)
  *G08G 1/052*    (2006.01)

(52) U.S. Cl.
  CPC ........... *G08G 1/0116* (2013.01); *G08G 1/052* (2013.01)

(58) Field of Classification Search
  CPC .......................... G08G 1/0116; G08G 1/052
  USPC ....................................................... 701/119
  See application file for complete search history.

(56) References Cited

U.S. PATENT DOCUMENTS

| | | | |
|---|---|---|---|
| 8,014,937 B2 | 9/2011 | Smyth et al. | |
| 2004/0034467 A1 | 2/2004 | Sampedro et al. | |
| 2012/0095682 A1* | 4/2012 | Wilson ................... | G01C 21/32 701/532 |
| 2013/0275033 A1* | 10/2013 | Bastiaensen ........... | G01C 21/26 701/119 |

(Continued)

FOREIGN PATENT DOCUMENTS

| | | |
|---|---|---|
| EP | 1 938 296 B1 | 7/2008 |
| EP | 2 278 573 A | 1/2011 |

(Continued)

OTHER PUBLICATIONS

"A New Kind of Fundamental Diagram with an Application to Road Traffic Emission Modelling"; [online] [retrieved Aug. 10, 2015]. Retrieved from the Internet: http://www.researchgate.net/profile/Antoine_Tordeux/publication/259535754_A_new_kind_of_fundamental_diagram_with_an_application_to_road_traffic_emission_modeling/links/00b7d52cea5f2bede2000000.pdf. (dated Mar. 2014); pp. 1-23.

(Continued)

*Primary Examiner* — Brian P Sweeney
(74) *Attorney, Agent, or Firm* — Alston & Bird LLP (57) ABSTRACT

A method, apparatus and computer program product are provided in order to identify a bi-modality condition upstream of diverging downstream road segments. In the context of a method, a distribution of speeds associated with a plurality of probe points representative of travel along the road segment upstream of diverging downstream road segments is determined. The method also includes evaluating the distribution so as to cluster the speeds associated with the plurality of probe points into a higher speed cluster associated with a higher speed and a lower speed cluster associated with a lower speed. The method also includes identifying a bi-modality condition upstream of the diverging downstream road segments based upon a relationship between the higher speed and the lower speed. The method further includes determining an extent to the bi-modality condition upstream of the diverging downstream road segments.

19 Claims, 7 Drawing Sheets

(56) References Cited

U.S. PATENT DOCUMENTS

2013/0282264 A1* 10/2013 Bastiaensen ....... G01C 21/3492
  701/119
2016/0004915 A1   1/2016 Chen et al.

FOREIGN PATENT DOCUMENTS

| WO | WO 2007/103180 A2 | 9/2007 |
| WO | WO 2008/021551 A2 | 2/2008 |
| WO | WO 2011/160039 A1 | 12/2011 |
| WO | WO 2012/089281 A1 | 7/2012 |
| WO | WO 2012/104392 A1 | 8/2012 |

OTHER PUBLICATIONS

"A Driving Route Made Just for You" [online] [retrieved Apr. 15, 2015]. Retrieved from the Internet: <URL: http://www.technologyreview.com/news/425271/a-driving-route-made-just-for-you/>. (dated Aug. 30, 2011); 2 pages.
Wane, Zuchao, et al.; "*Visual Traffic Jam Analysis Based on Trajectory Data*"; IEEE Transactions on Visualization and Computer Graphics; vol. 19, No. 12; Dec. 2013; pp. 2159-2168.
International Search Report and Written Opinion for International Application No. PCT/EP2016/063758 dated Oct. 7, 2016.
U.S. Appl. No. 15/142,336, by inventor Fowe et al., entitled "Method and Apparatus for Identifying a Split Lane Traffic Location," filed Apr. 19, 2016.
Speeded Up Robust Features—Wikipedia [online] [retrieved Nov. 30, 2016]. Retrieved from the Internet: <URL:https://en.wikipedia.org/wiki/Speeded_up_robust_features>. 4 pages.
Viterbi Algorithm—Wikipedia [online] [retrieved Nov. 30, 2016]. Retrieved from the Internet: <URL:https://en.wikipedia.org/wiki/Viterbi_algorithm>. 9 pages.
Canny Edge Detector—Wikipedia [online] [retrieved Nov. 30, 2016]. Retrieved from the Internet: <URL:https://en.wikipedia.org/wiki/Canny_edge_detector>. 6 pages.

\* cited by examiner

METHOD AND APPARATUS FOR IDENTIFYING A BI-MODALITY CONDITION UPSTREAM OF DIVERGING ROAD SEGMENTS

TECHNOLOGICAL FIELD

An example embodiment relates generally to the identification of a bi-modality condition upstream of diverging downstream road segments and, more particularly, to the determination of the extent of the bi-modality condition upstream of the diverging downstream road segments.

BACKGROUND

Split lane traffic is the traffic that travels along a road segment that splits or is otherwise divided into two or more downstream road segments. Split lane traffic may sometimes create a bi-modality condition in which traffic in some of the lanes moves at a higher speed than traffic in other lanes. For example, a road segment may be upstream of two or more diverging downstream road segments, such as an exit ramp that exits to the right or left of an ongoing roadway. In some instances, the traffic in the lanes that are utilized to access the exit ramp may slow to a greater degree than the traffic in the other lanes that generally proceeds onward past the exit ramp. For example, at rush hour or at other times at which the roadway carries an appreciable volume of traffic, the lanes from which the exit ramp is accessed may slow to a much greater degree than the traffic in the other lanes that is generally preceding onward past the exit ramp. At other times, such as in instances in which the traffic volume is relatively light, all of the lanes of traffic for the road segment upstream of that diverging downstream road segments may precede at approximately the same speed with little, if any, diminution of speed in the lanes from which the exit ramp is accessed.

Routing algorithms, such as routing algorithms employed by navigation devices, generally do not take into account the speed differential between different lanes of traffic, particularly in instances in which the speed differential is transient. As such, the routing algorithms may not perform as well as is desired when confronted with a bi-modality condition. For example, in instances in which the speed of traffic flow various significantly between the various lanes of a road segment upstream of the diverging downstream road segments, the routing algorithm may operate on the assumption that the traffic will move uniformly at the higher speed experienced by the lanes of traffic that proceed onward past the exit ramp without any appreciable diminution of the speed due to traffic delays in advance of the exit ramp. Consequently, a user or an autonomous vehicle that is relying upon the routing algorithm and who drives in the lane of traffic that is delayed in advance of the exit ramp may find that the estimated time of arrival provided by the routing algorithm may be incorrect. Depending upon the extent of the delay, the user also may be disappointed that the routing algorithm did not either direct the user to a different roadway or otherwise endeavor to avoid the lanes of traffic that slowed in advance of the exit ramp.

BRIEF SUMMARY

A method, apparatus and computer program product are provided in accordance with an example embodiment in order to identify a bi-modality condition upstream of diverging downstream road segments. In this regard, the method, apparatus and computer program product of an example embodiment may identify a bi-modality condition in instances in which one or more lanes of the road segment upstream of the diverging downstream road segments has a higher speed than other lanes of the road segment upstream of the diverging downstream road segments. By identifying the bi-modality condition and determining the extent of the bi-modality condition upstream of the diverging downstream road segments, the bi-modality condition may be taken into account, such as by a routing algorithm, in conjunction with the routing of a vehicle, the directions provided along the route, such as to avoid the lanes of the road segment that are experiencing delays upstream of the diverging downstream road segments and the estimation of the time of arrival.

In an example embodiment, a method is provided that includes determining a distribution of speeds associated with a plurality of probe points representative of travel along the road segment upstream of diverging downstream road segments. The method of this example embodiment also includes evaluating the distribution so as to cluster the speeds associated with the plurality of probe points into a higher speed cluster associated with a higher speed and a lower speed cluster associated with a lower speed. The method of this example embodiment also includes identifying a bi-modality condition upstream of the diverging downstream road segments based upon a relationship between the higher speed and the lower speed. The method of this example embodiment further includes determining an extent to the bi-modality condition upstream of the diverging downstream road segments.

The road segment upstream of that diverging downstream road segments may include a plurality of links. In this example embodiment, the method determines the extent of the bi-modality condition by determining one or more links for which the bi-modality condition exists. In this regard, the method of an example embodiment determines one or more links for which the bi-modality condition exists by including each link of the road segment upstream of the diverging downstream road segments until a predefined number of consecutive links fail to satisfy the bi-modality condition. Regarding the road segment upstream of the diverging downstream road segments that includes a plurality of links, the method of an example embodiment determines the distribution of speeds, evaluates the distribution and identifies the bi-modality condition upstream of the diverging downstream road segments individually for each of the plurality of links.

The method of an example embodiment also includes causing a notification of the bi-modality condition to be provided. In this regard, the method may cause the notification of the bi-modality condition to be provided by causing the higher speed and the lower speed to be provided in association with links of the road segment upstream of the diverging downstream road segments.

The method of an example embodiment identifies the bi-modality condition by determining a difference between the higher speed and the lower speed and then normalizing the difference based upon a range of the distribution to determine a magnitude of bi-modality. A method of this example embodiment also identifies the bi-modality condition based upon a comparison of the magnitude of bi-modality to a predefined threshold.

In another example embodiment, an apparatus is provided that includes at least one processor and at least one memory including computer program code with the at least one memory and the computer program code configured to, with the processor, cause the apparatus to at least determine a distribution of speeds associated with a plurality of probe points representative of travel along a road segment upstream of the diverging downstream road segments. The at least one memory and computer program code are also configured to, with the processor, cause the apparatus to evaluate the distribution so as to cluster the speeds associated with the plurality of probe points into a higher speed cluster associated with a higher speed and a lower speed cluster associated with a lower speed. The at least one memory and the computer program code are further configured to, with the processor, cause the apparatus to identify a bi-modality condition upstream of the diverging downstream road segments based upon a relationship between the higher speed and the lower speed. The at least one memory and the computer program code are additionally configured to, with the processor, cause the apparatus to determine an extent of the bi-modality condition upstream of the diverging downstream road segments.

The road segment of an example embodiment that is upstream of the diverging downstream road segments includes a plurality of links. The at least one memory and the computer program code are configured to, with the processor, cause the apparatus of this example embodiment to determine the extent of the bi-modality condition by determining one or more links for which the bi-modality condition exists. The at least one memory and the computer program code are configured to, with the processor, cause the apparatus of this example embodiment to determine one or more links for which the bi-modality condition exists by including each link of the road segment upstream of the diverging downstream road segments until a predefined number of consecutive links fail to satisfy the bi-modality condition. The at least one memory and the computer program code are configured to, with the processor, cause the apparatus of this example embodiment to determine the distribution of speeds, evaluate the distribution and identify the bi-modality condition upstream of the diverging downstream road segments individually for each of the plurality of links.

The at least one memory and the computer program code are further configured to, with the processor, cause the apparatus of an example embodiment to cause a notification of the bi-modality condition to be provided. In this example embodiment, the at least one memory and the computer program code are configured to, with the processor, cause the apparatus to cause the notification of bi-modality condition to be provided by causing the higher speed and the lower speed to be provided in association with links of the road segment upstream of the diverging downstream road segments.

The at least one memory and the computer program code are configured to, with the processor, cause the apparatus of an example embodiment to identify the bi-modality condition by determining a difference between the higher speed and the lower speed. The at least one memory and the computer program code are also configured to, with the processor, cause the apparatus of this example embodiment to normalize the difference based upon a range of the distribution, to determine a magnitude of bi-modality and to identify the bi-modality condition based upon a comparison of the magnitude of bi-modality to a predefined threshold.

In a further example embodiment, a computer program product is provided that includes at least one non-transitory computer-readable storage medium having computer-executable program code portions stored therein with the computer-executable program code portions including program code instructions configured to determine a distribution of the speeds associated with a plurality of probe points representative of travel along a road segment upstream of the diverging downstream road segments. The computer-executable program code portions also include program code instructions configured to evaluate the distribution so as to cluster the speeds associated with the plurality of probe points into a higher speed cluster associated with a higher speed and a lower speed cluster associated with a lower speed. The computer-executable program code portions further include program code instructions configured to identify a bi-modality condition upstream of the diverging downstream road segments based upon a relationship between the higher speed and the lower speed and program code instructions configured to determine an extent of the bi-modality condition upstream of the diverging downstream road segments.

The road segment of an example embodiment that is upstream of the diverging downstream road segments includes a plurality of links. The program code instructions are configured to determine the extent of the bi-modality condition include, in this example embodiment, program code instructions configured to determine one or more links for which the bi-modality condition exists. In this example embodiment, the program code instructions configured to determine one or more links for which the bi-modality condition exists include program code instructions configured to include each link of the road segment upstream of the diverging downstream road segments until a predefined number of consecutive links fail to satisfy the bi-modality condition. In this example embodiment, the program code instruction configured to determine the distribution of speeds, the program code instructions configured to evaluate the distribution and the program code instructions configured to identify the bi-modality condition upstream of the diverging downstream road segments are performed individually for each of the plurality of links.

The computer-executable program code portions of an example embodiment additionally include program code instructions configured to cause a notification of the bi-modality condition to be provided. The program code instructions that are configured to cause the notification of the bi-modality condition to be provided include, in an example embodiment, program code instructions configured to cause the higher speed and the lower speed to be provided in association with links of the road segment upstream of the diverging downstream road segments. The program code instructions that are configured to identify the bi-modality condition in an example embodiment include program code instructions configured to determine the difference between the higher speed and the lower speed. In this example embodiment, the program code instructions configured to identify the bi-modality condition also include program code instructions configured to normalize the difference based upon a range of the distribution to determine a magnitude of bi-modality and program code instructions configured to identify the bi-modality condition based upon a comparison of the magnitude of bi-modality to a predefined threshold.

In yet another example embodiment, an apparatus is provided that includes means for determining a distribution of speeds associated with a plurality of probe points representative of travel along a road segment upstream of the diverging downstream road segments. The apparatus also includes means for evaluating the distribution so as to cluster the speeds associated with the plurality of probe points into a higher speed cluster associated with a higher speed and a lower speed cluster associated with a lower speed. The apparatus further includes means for identifying a bi-modality condition upstream of the diverging downstream road segments based upon the relationship between the higher speed and the lower speeds and means for determining the extent of the bi-modality condition upstream of the diverging downstream road segments.

The road segment of an example embodiment that is upstream of the diverging downstream road segments includes a plurality of links. In this example embodiment, the means for determining the extent of the bi-modality condition includes means for determining one or more links for which the bi-modality condition exists. The means for determining one or more links for which the bi-modality condition exist includes, in an example embodiment, means for including each link of the roads segment upstream of the diverging downstream road segments until a predefined number of consecutive links fails to satisfy the bi-modality condition. In this example embodiment, the means for determining the distribution of speeds, the means for evaluating the distribution and the means for identifying the bi-modality condition upstream of the diverging downstream road segments are performed individually for each of the plurality of links.

The apparatus of an example embodiment also includes means for causing a notification of bi-modality condition to be provided. In this example embodiment, the means for causing the notification of the bi-modality condition to be provided includes means for causing the higher speeds and lower speeds to be provided in association with links of the road segment upstream of the diverging downstream road segments.

The means for identifying the bi-modality condition includes, in an example embodiment, means for determining the difference between the higher speeds and the lower speeds and means for normalizing the difference based upon a range of the distribution to determine a magnitude of bi-modality. The means for identifying the bi-modality condition also includes, in this example embodiment, means for identifying the bi-modality condition based upon a comparison of the magnitude of the bi-modality to a predefined threshold.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to identify a bi-modality condition upstream of diverging downstream road segments, such as by identifying instances in which the speed of travel along a road segment upstream of diverging downstream road segments varies appreciably between the different lanes of traffic so as to be clustered into a higher speed cluster and a lower speed cluster, likely attributable to the effects upon traffic by the diverging downstream road segments. The method, apparatus and computer program product of an example invention also determine the extent of the bi-modality condition upstream of the diverging downstream road segments. As such, the method, apparatus and computer program product of an example embodiment may allow for improved accuracy in the determination of the estimated time of arrival by taking into account the existence and the extent of a bi-modality condition that may be encountered. Additionally or alternatively, the method, apparatus and computer program product of an example embodiment may provide improvements in routing algorithms by taking into account the bi-modality condition, such as to either entirely re-route a vehicle based upon the bi-modality condition and/or to advise a driver or an autonomous vehicle of an upcoming bi-modality condition such that the driver may consider altering their driving behavior or the autonomous vehicle may determine to alter the driving behavior, such as by changing lanes, to take into the bi-modality condition into account.

Figure 1:
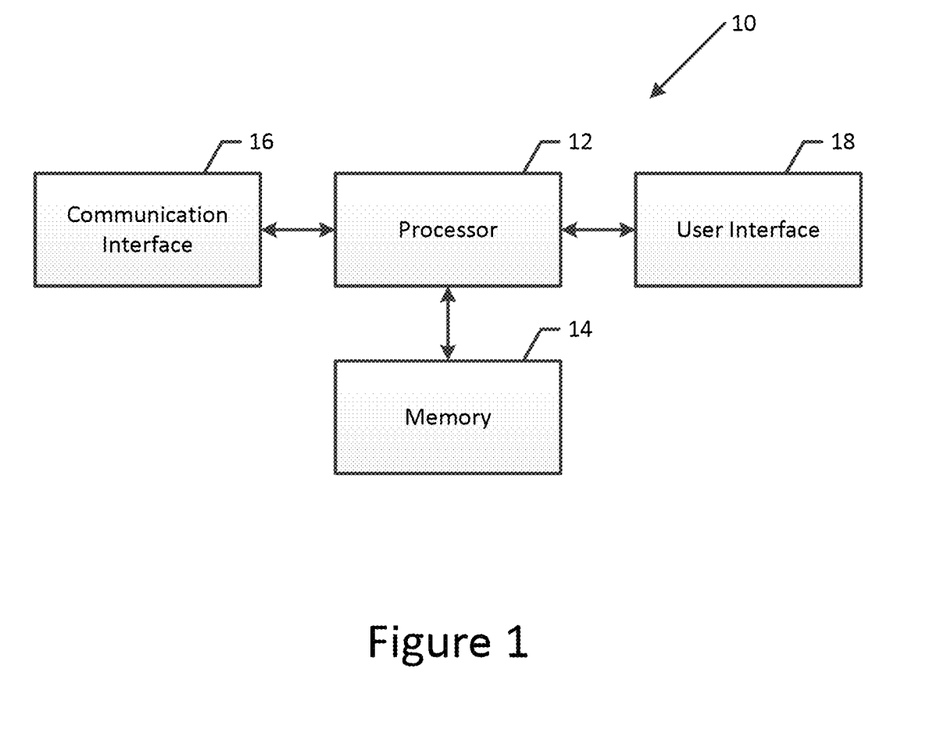
FIG. 1 is a block diagram of an apparatus that may be specifically configured in accordance with an example embodiment of the present invention.

The apparatus for identifying a bi-modality condition and for determining the extent of the bi-modality condition may be embodied by a variety of computing devices including, for example, a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points to identify and characterize a bi-modality condition. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Figure 2:
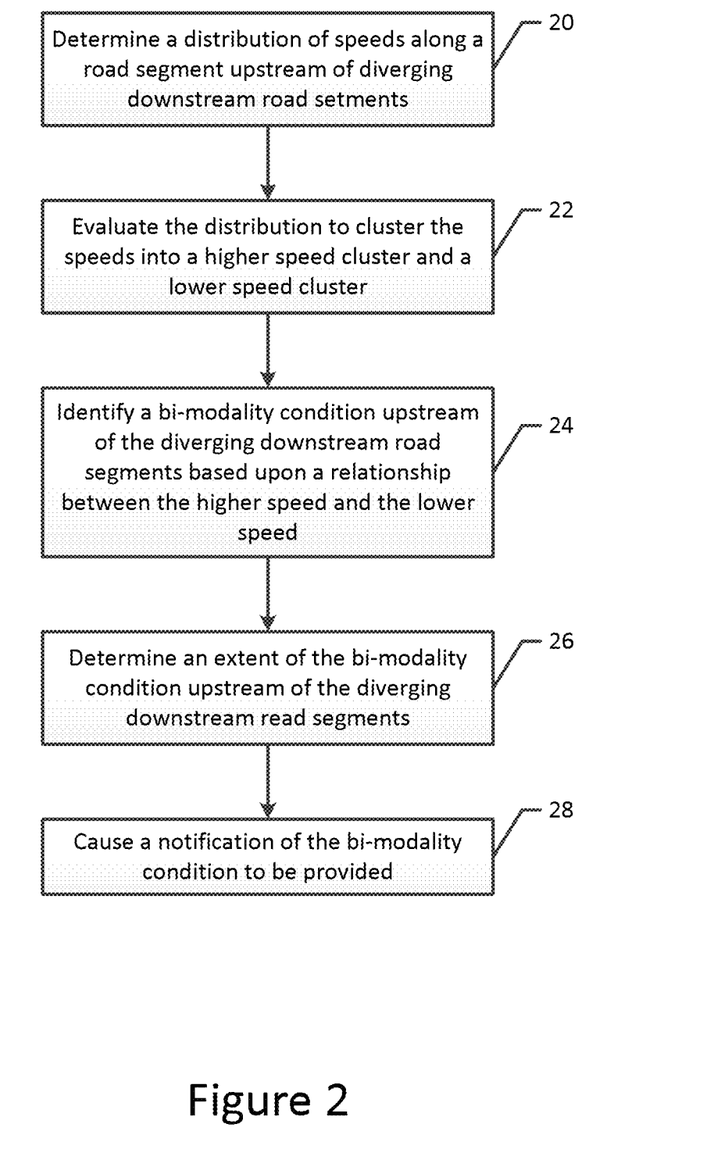
FIG. 2 is a flowchart illustrating operations performed in accordance with an example embodiment of the present invention.
Figure 3:
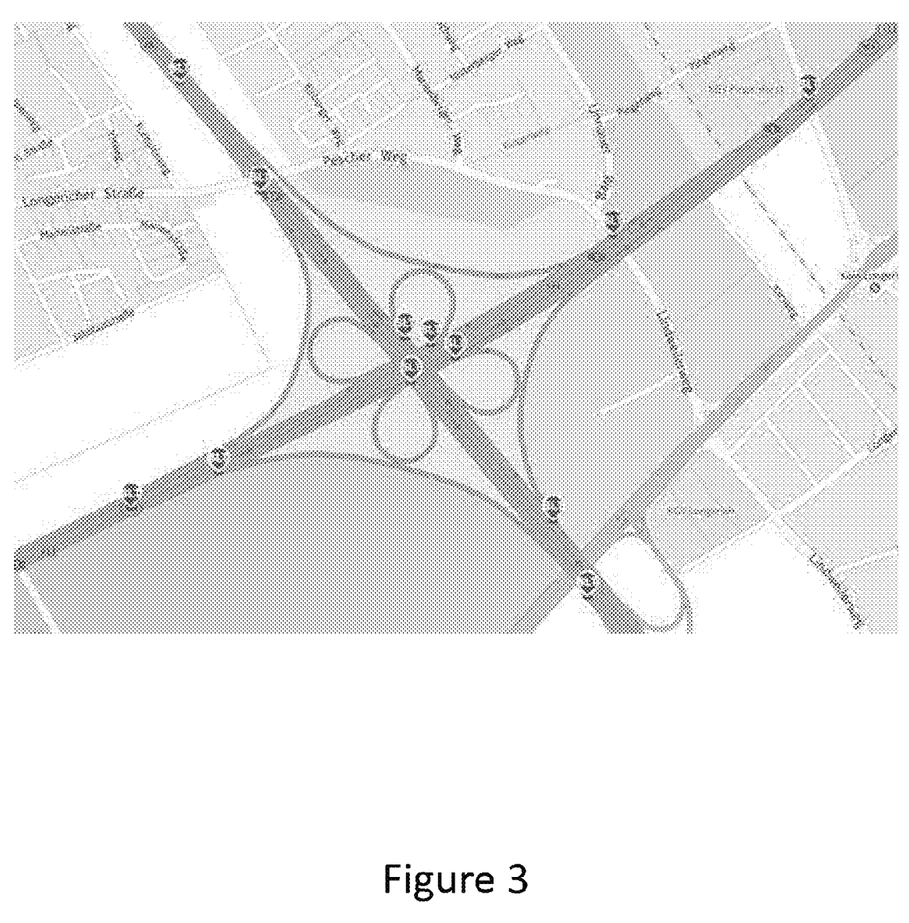
FIG. 3 is a representation of a map depicting locations along various road segments that may experience the impact of delays associated with split lane traffic.

Referring now to FIG. 2, the operations performed in order to identify a bi-modality condition and to determine the extent of the bi-modality condition in accordance with an example embodiment are illustrated. With respect to block 20 of FIG. 2, for example, the apparatus 10 includes means, such as the processor 12 or the like, for determining a distribution as speeds along a road segment upstream of two or more diverging downstream road segments. In this regard, the locations of split lane traffic (SLT) in which a road separates into two or more diverging downstream road segments, such as in an instance in which an exit lane diverges from the main road, may be identified. By way of example, FIG. 3 depicts a portion of a map in which a plurality of locations along the roads are designated by SLT to indicate the location of split lane traffic. In each instance, a road segment designated by SLT diverges into two or more downstream road segments.

Figure 4A:
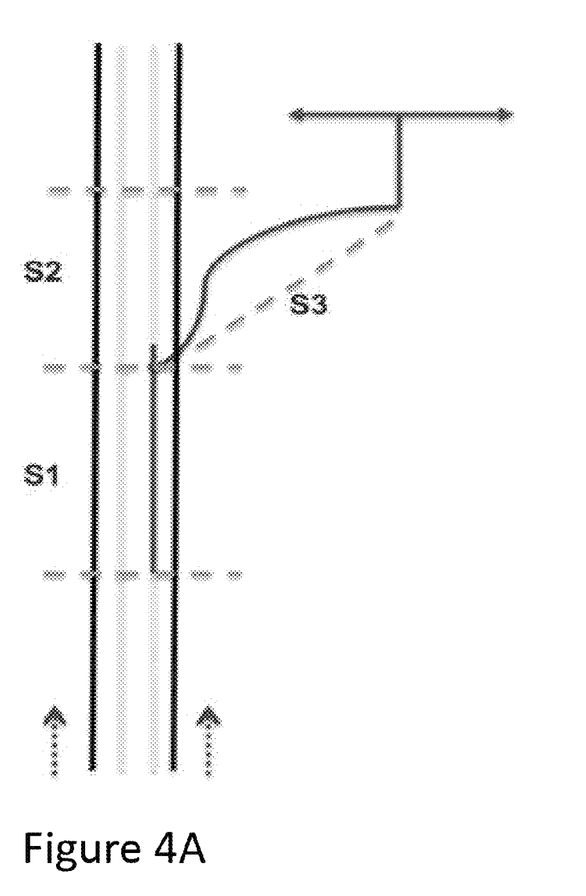
FIG. 4A illustrates the upstream road segment and the diverging downstream road segments that are evaluated in accordance with an example embodiment of the present invention.

In addition, the road that diverges into two or more downstream road segments may include a plurality of lanes such that the speed of traffic in each lane may be different depending upon the behavior of the vehicles in response to the diverging downstream road segments. By way of example, FIG. 4A depicts an upstream road segment S1 that includes two lanes of traffic. The road segment S1 is upstream of two diverging downstream road segments, namely, a road segment S2 which is a continuation of the road segment S1 and an exit ramp represented by road segment S3. As shown, the right lane of the segment S1 may be more greatly impacted by traffic slowing to take the exit ramp represented by road segment S3 in comparison to the left lane of road segment S1 which continues along road segment S2

The apparatus 10, such as the processor 12, may have identified the locations of split lane traffic within a network of roads in various manners. For example, the split lane traffic locations may have been previously identified, such as manually during the design of a map or by a prior computerized analysis of the map, and the split lane traffic locations may be stored, such as either locally by memory 14 or remotely by a memory with which the apparatus is in communication, such as via the communication interface 16. For example, the split lane traffic locations may be stored remotely by a server, a remote database, cloud storage or the like. Alternatively the apparatus, such as the processor, may be configured to evaluate a network of roads, such as a represented by map data, and to identify the locations, that is the SLT locations, at which a road, such as a multi-lane road, diverges into two or more downstream road segments.

Regardless of the manner in which the divergent downstream road segments are identified, the apparatus 10 of an example embodiment, such as the processor 12 or the like, is configured to determine the distribution of speeds along the road segment upstream of the diverging downstream road segments. In this regard, the apparatus, such as the processor, may be configured to evaluate a plurality of probe points representative of travel along the road segment upstream of the diverging downstream road segments. The probe points may be collected by a variety of different data collection devices, such as GPS systems, navigation systems or other location tracking systems. These data collection devices may be carried by vehicles, for example, as the vehicles that travel along the roads. For example, the data collection devices may be mounted within the vehicles, such as a component of a navigation system, an advanced driver assistance system (ADAS) or the like, or may be carried by the passengers within the vehicle, such as in an instance in which the data collection device is embodied by a mobile terminal, tablet computer or other portable computing device carried by the passenger riding within the vehicle. The data collection devices repeatedly capture probe points as the data collection devices move along a respective road, such as by capturing probe points at a predefined frequency.

Each probe point defines the location at which the probe point was captured, such as in terms of latitude and longitude. The probe point may also include or otherwise be associated with a variety of other information including, for example, the speed of the vehicle at the time at which the probe point was captured. The probe points may be stored locally, such as by the memory device 14, or remotely, such as by cloud storage, a remote server, a remote database or the like, in such a manner as to be accessible by the processor 12, such as via the communication interface 16.

Figure 4B:
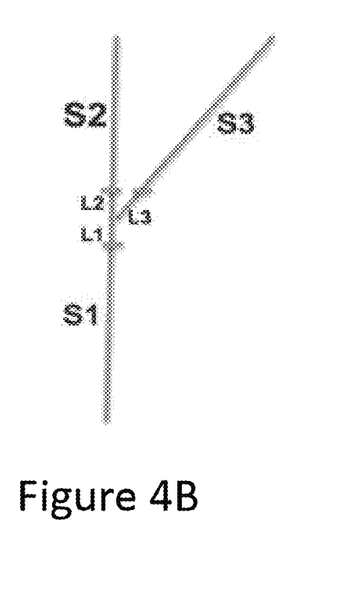
FIG. 4B illustrates the initial links of each of the upstream road segment and the pair of diverging downstream road segments that are evaluated in accordance with an example embodiment of the present invention.

In addition to generally identifying the location of the vehicle upon the road segment upstream of a plurality of divergent downstream road segments, the probe points may identify the location with sufficient granularity as to permit the lane in which the vehicle is traveling along the road segment upstream of the divergent downstream road segments to be identified. In addition, at least the road segment upstream of the diverging downstream road segments may be comprised of a plurality of sequential links arranged serially to form respective lanes of the road segment. With reference to the example of FIG. 4B, the upstream road segment S1 and the diverging downstream road segments S2, S3 each include a link L1, L2, L3 immediately adjacent the location at which the downstream road segments diverge from the upstream road segment. Although only the link immediately adjacent to the point of divergence is depicted in FIG. 4B, at least some of the road segments S1, S2, S3 may include a plurality of sequential links arranged in a serial fashion. As such, the probe points may not only generally provide the location of a vehicle along a road segment, such as within a lane of a road segment, but may provide the location with sufficient specificity such that the link of the road segment and the lane of the road segment in which the vehicle is traveling at the time that the probe point is captured may be identified.

Figure 5:
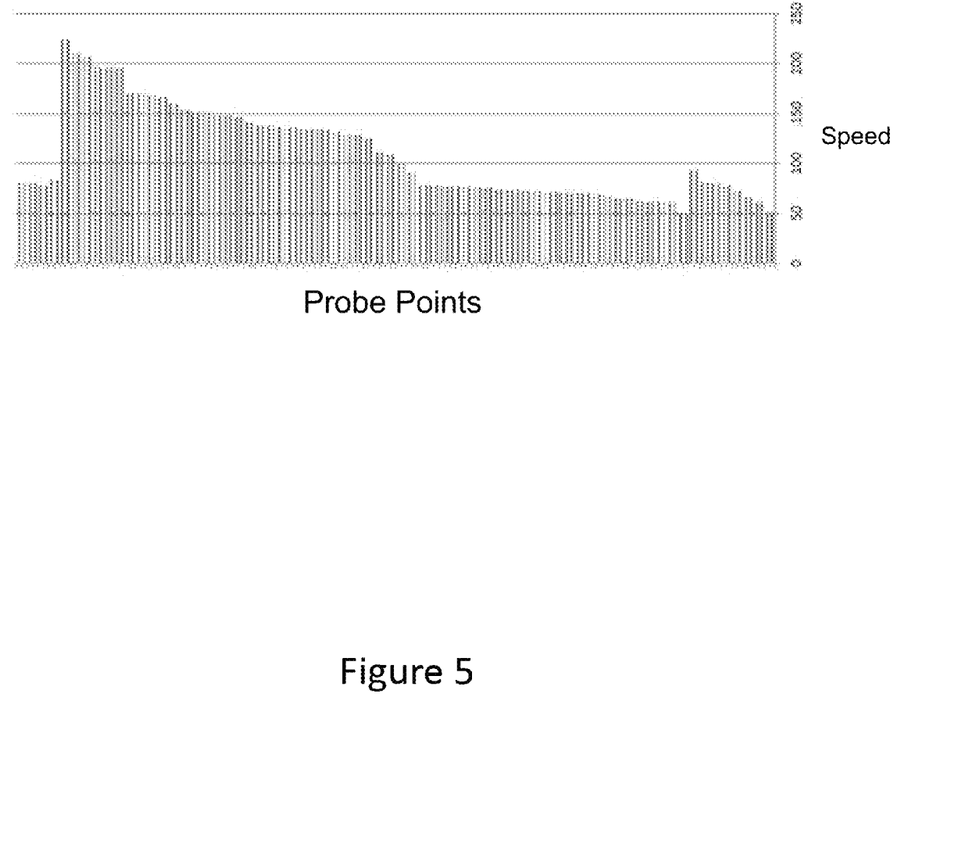
FIG. 5 is a graphical representation of the distribution of speeds associated with a plurality of probe points that illustrates a manner in which the speeds may be clustered into a higher speed cluster and a lower speed cluster in accordance with an example embodiment of the present invention.

Although the distribution of the speeds along the road segment upstream of the diverging downstream road segments may be represented in various manners, one distribution of the speeds along the road segment upstream of a diverging downstream road segment is depicted in FIG. 5 in which the speed, represented by the vertical axis, is depicted for each of plurality of vehicles traveling along the road segment upstream of a diverging downstream road segment within a predetermined period of time, such as 5, 10 or 15 minutes. The speed of each vehicle is represented by a vertical bar in the graphical presentation of FIG. 5. The distribution of speeds may be of evaluated based upon historical traffic patterns, such as the traffic patterns on predetermined days and times, along the road segment upstream of the diverging downstream road segments. Based on the analysis of the historical traffic patterns, the days and times at which a bi-modal condition exists may be identified, such as by identifying a slow down in the traffic in the right lane of a road segment upstream of an exit ramp that diverges to the right of the road segment during rush hour, that is, between 7 AM and 9 AM and between 4 PM and 6 PM on weekdays. However, the apparatus 10, such as the processor 12, of an alternate embodiment may be configured to evaluate the distribution of speeds in real time or near real time by considering the distribution of speeds associated with the probe points captured within a time period immediately preceding the current time, such as within the last 5, 10, or 15 minutes, in order to evaluate the current road conditions upstream of the diverging downstream road segments.

As shown in block 22 of FIG. 2, the apparatus 10 of this example embodiment also includes means, such as the processor 12 or the like, for evaluating the distribution to cluster the speeds into a higher speed cluster and a lower speed cluster. Although the evaluation of the distribution maybe performed in various manners, the apparatus, such as the processor, of an example embodiment may be configured to evaluate the distribution of speeds in order to identify if a majority of the probe points are associated with speeds that fall within two different ranges of speeds, one range representative of a higher speed cluster and another range representative of a lower speed cluster. These two ranges may be defined in various manners, but, in one embodiment, the higher speed cluster may be separated from the lower speed cluster. With respect to the example depicted in FIG. 5, a higher speed cluster may be identified within a range of 150-200 km/hr and another range may be identified from 50-70 km/hr.

Figure 6:
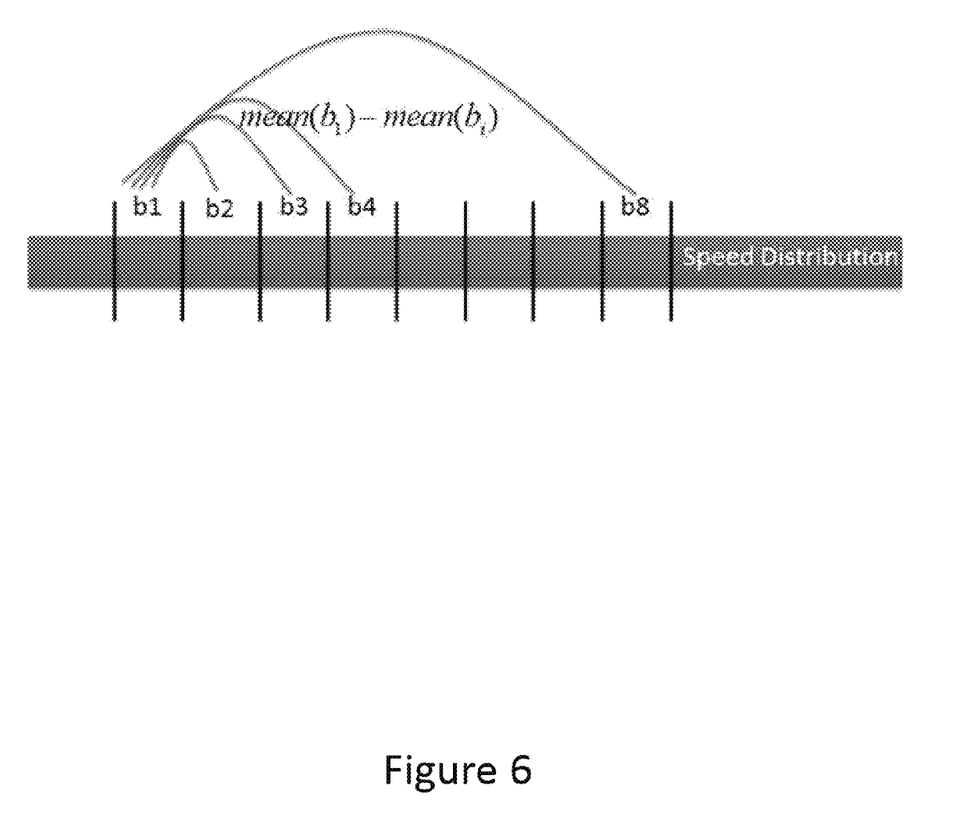
FIG. 6 is a graphical representation of the manner in which the distribution of speeds is evaluated in accordance with an example embodiment of the present invention in order to identify a higher speed cluster and a lower speed cluster.

As shown in block 24, the apparatus 10 of an example embodiment also includes means, such as the processor 12 or the like, for identifying a bi-modality condition upstream of the diverging downstream road segments based upon a relationship between the higher speed and the lower speed. In an example embodiment, the apparatus 10, such as the processor 12, utilizes a clustering/partitioning algorithm to split a bi-modal speed distribution into the higher speed cluster and the lower speed cluster. In this example embodiment, the apparatus, such as the processor, is configured to discretize the speeds associated with the probe points into a plurality of bins designated b1, b2 . . . b8 in the example of FIG. 6 and to then determine the mean distance between the bins, such as represented by mean $(b_1)$–mean $(b_j)$. The apparatus, such as the processor, then utilizes the mean distance between bins to identify the higher speed cluster and the lowest speed cluster of the speeds associated with the probe points. The apparatus, such as the processor, of this example embodiment is also configured to determine a magnitude of bi-modality BiM which, in turn, is utilized to identify a bi-modality condition. Although the magnitude of bi-modality may be defined in various instances, the apparatus, such as the processor, of an example embodiment may be configured to determine the magnitude of bi-modality as the greatest difference between the mean speeds of different bins divided by the range, such as BiM=(mean $b_1$–mean(V–$b_1$))/R with V and R as defined hereinafter. In an instance in which the magnitude of bi-modality is zero or is at least less than a predefined threshold, the apparatus, such as the processor, may be configured to determine that the distribution of the speeds associated with the probe points does not indicate a bi-modality condition, such as an instance in which traffic moves along each lane of the road segment upstream of the diverging downstream road segments in a relatively uniform manner. However, in an instance in which the magnitude of bi-modality exceeds the predefined threshold, a bi-modality condition may be identified.

In an example embodiment, the apparatus 10, such as the processor 12, is configured to determine the magnitude of bi-modality and to identify a bi-modality condition therefrom in accordance with the following pseudo code:

Pseudo Code:

```
V ← {a set of probe speeds in an epoch}
function BDM (V) :
    s ← STD(V)
    m ← mean(V)
    V ← V ∀ V < m + 2s & V > m − 2s        // first outlier filtering
    d ← Range(V)/8
    for i←1 to 8                            //bucketizing
        b_i ← {max(V) ... (max(V) − d)}
        V ← V − b_i
    end for
    V ← b_1 + b_2 +...+ b_8                 //restore V
    for i←2 to 8                            // biased outlier rejection in favour of faster speeds BiM ← (mean(b_1) − mean(V − b_1)) / Range(V)

if |b_1| > 3 and BiM > 0.4          //3 & 0.4 are tuning paramters
            then return : {(mean(b_1), mean(V − b_1),BiM}    // HS,LS & BiM returned
        else b_1 ← b_1 + b_i
        end if
    end for
end BDM
```

As shown in the foregoing pseudo code, probe points associated with speeds that are outliers, such as probe points associated with speeds that are more than two standard deviations away from the mean, may be filtered or eliminated. Thereafter, the remaining speeds associated with the probe points may be separated into bins $b_1, b_2, \ldots b_8$ and the BiM may be determined based upon the difference between the means of the various bins as normalized fashion based upon the range. In this analysis, the normalized difference between the means of the different bins may be subjected to various predefined conditions, such as $|b1|>3$ and $BiM>0.4$, with the predefined conditions defining tuning parameters that may be varied by the system designer to ensure the desired performance. In this regard, the tuning parameters may be selected so as to return only as single pair of speeds, representative of the higher speed cluster and the lower speed cluster, as well as the magnitude of bi-modality BiM.

Once a bi-modality condition has been identified along the road upstream of a diverging downstream road segments, the apparatus 10 of an example embodiment includes means, such as the processor 12 or the like, for determining the extent of the bi-modality condition upstream of the diverging downstream road segments. See block 26 of FIG. 2. The extent of the bi-modality condition may be defined in various manners. In an example embodiment, the apparatus, such as the processor, may be configured to define the bi-modality condition to extend along the entire road segment upstream of the diverging downstream road segments.

However, in another example embodiment, the individual links of the road segment upstream of the diverging downstream road segments are evaluated to determine if the respective link is subject to the bi-modality condition. In this regard, a link includes a portion of the road segment including each lane of the road segment. A link of a road segment is considered to exhibit bi-modality in an instance the speeds associated with the probe points located within the respective link satisfy the bi-modality condition, such as defined by the BiM. Thus, for each link of the upstream road segment, the speeds associated with the probe points located within the respective link may be evaluated as described above in order to separate the speeds into different bins and to then determine the magnitude of bi-modality BiM which, in turn, is utilized to identify if the link is subject to a bi-modality condition.

Figure 7:
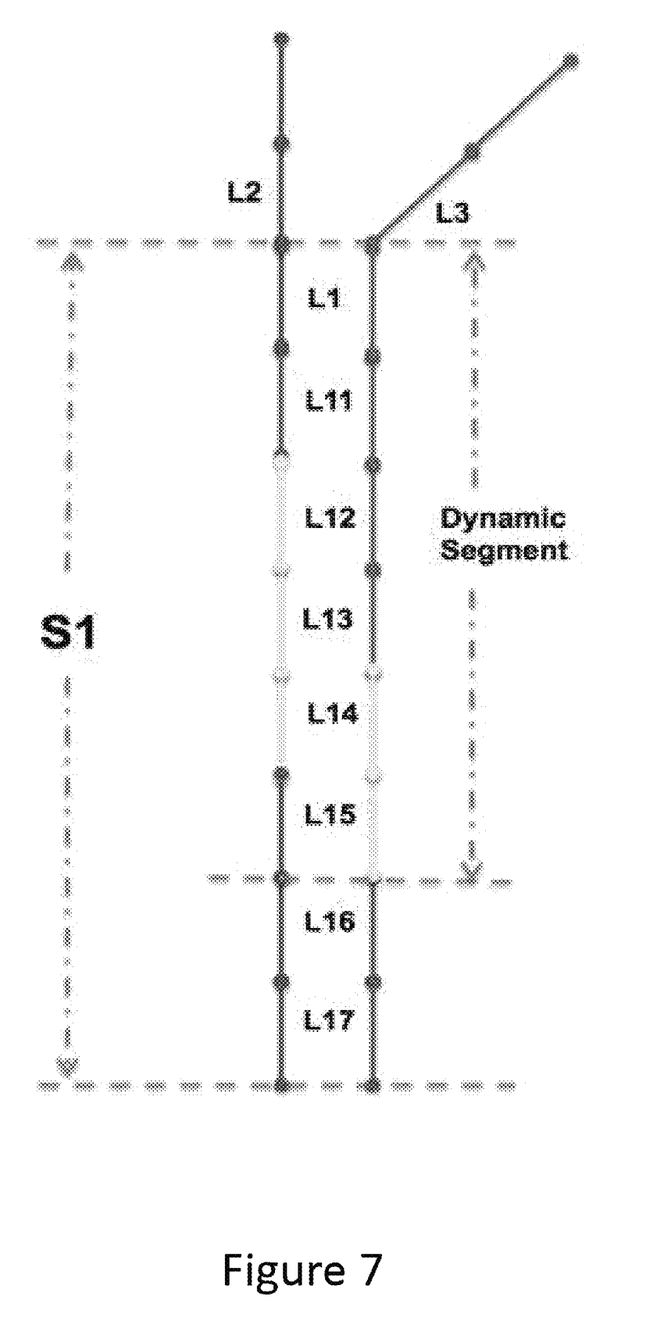
FIG. 7 is a representation of a manner in which the extent of the bi-modality condition upstream of the diverging downstream road segments is determined based upon the links of the upstream road segment in accordance with an example embodiment of the present invention.

In regard to determining whether the bi-modality condition exists for each link of the road segment upstream of the diverging downstream road segments, the apparatus 10, such as the processor 12, of an example embodiment may sequentially evaluate each link beginning with the link at or closest to the location at which the downstream road segments diverge, such as link L1 in FIG. 7, and continuing link-by-link in an upstream direction away from the point at which the downstream road segments diverge. Each link is evaluated in order to determine if the respective link satisfies the bi-modality condition. The extent of the bi-modality condition is configured to extend upstream of the point at which the downstream road segments diverge until a predefined condition is satisfied, such as until a predefined number of consecutive links fail to satisfy the bi-modality condition or until one or more consecutive links of at least a predefined length fail to satisfy the bi-modality condition. In an example embodiment, the predefined number of consecutive links may be 1 in an instance in which the failure of a single link to satisfy the bi-modality condition may terminate the extent of the road segment upstream of the diverging downstream road segments that is configured to experience a bi-modality condition. In another example embodiment, however, the predefined number of consecutive links that must fail to satisfy the bi-modality condition in order to terminate the extent of the bi-modality condition upstream of the diverging downstream road segments may be two links, or another predefined number of links depending upon the system designer.

By way of example, the apparatus 10, such as the processor 12, of an example embodiment is configured to aggregate one or more links of the upstream road segment in order to define the extent of the bi-modality condition as described by the following pseudo code:

```
S1 ← {L_0,L_1,L_2,....,L_N};DS ← { }
Agg(S1)
    IF (L_0 == " Bi-Modal")DS ← {L_0}
    ELSE return DS
    for i ← 1 to N
        IF(L_i,L_{i-1} != " Bi-Modal")
            Then return DS
        ELSE IF(L_i == " Bi-Modal")DS ← DS ∪ {L_i,L_{i-1}}
    end for
    return DS
end Agg
```

In the example of FIG. 7, links L1, L11, L12, L13, L14, L15, L16 and L17 extend progressively in a direction upstream of the point at which the downstream road segments diverge therefrom and are individually evaluated to identify whether the respective links exhibit the bi-modality condition and the mean speed associated therewith. In this regard, the links that have a red color are associated with the lower speed cluster, the links having a green color are associated with the higher speed cluster and the links having a yellow color are not associated with either the higher speed cluster or the lower speed cluster, such as links for which the majority of the probe point have a speed that falls outside of, such as between, the higher speed cluster and the lower speed cluster. In an instance in which the predefined number of consecutive links that must fail the bi-modality condition prior to terminating the extent of the bi-modality condition is 2, links L1, L12, L13 and L15 exhibit bi-modality since the speeds associated with the different lanes of traffic have different speeds. Links L11 and L14 are not bi-modal since the speeds associated with both lanes of traffic have the same speed. However, links L11 and L14 do not define the extent of the bi-modality condition since they are not part of two consecutive links that fail to satisfy the bi-modality condition. As shown in FIG. 7, links L16 and L17 do serve to terminate the extent of the bi-modal condition since links L16 and L17 consecutively fail to satisfy the bi-modality condition. Thus, the extent of the bi-modality condition of this example includes links L1, L11, L12, L13, L14 and L15.

The apparatus 10 of this example embodiment also includes means, such as the processor 12 or the like, for identifying the lane of the road segment immediately upstream of a diverging downstream road segments that is associated with each of the higher speed cluster and the lower speed cluster. In an example embodiment, the apparatus, such as the processor, separately determines the difference between the higher speed HS of the higher speed cluster to the average speed of each downstream segment, such as segments S2 and S3 in the example of FIGS. 4A and 4B. As such, the apparatus, such as the processor, of this example embodiment also receives or otherwise has access probe points captured during travel along the downstream segments and determines the average speed along a respective downstream segment based upon the probe points associated therewith. The apparatus, such as the processor, of this example embodiment is configured to associate the higher speed HS with the downstream segment that has the closest average speed. The lower speed may, in turn, be associated with the other downstream segment. In an example embodiment, the apparatus, such as the processor, requires the higher speed to be within a predefined speed differential, such as 10 kph, of the closest average speed of the downstream segments with the higher speed and lower speed LS values being considered invalid if the higher speed is not within the predefined speed differential of the closest average speed.

By way of example, the apparatus 10, such as the processor 12, of an example embodiment is configured to associate the higher and lower speeds with the downstream road segments in accordance with the following pseudo code:

```
input <- {HS, LS, V2, V3}    //V2 and V3 are the average speed on
                             S2 and S3
Validate (S1)
obj <- null;
    IF (|HS - V2| < |HS - V3|)
        IF (|HS - V2| <= 10)    // 10 (kph) is a configurable parameter
            obj <- ("HS-flag", "S1-to-S2"), ("LS-Flag", "S1-to-S3")
        ELSE
            return obj;
    ELSE
        IF (|HS - V3| <= 10)    // 10 is a configurable
                                parameter
            obj <- ("HS-Flag","S1-to-S3"),("LS-Flag", "S1-to-S2")
        ELSE
            obj <- null;
            return obj;
    return obj
end Validate
```

Although described above in conjunction with the evaluation of the speed associated with the higher speed cluster, the apparatus 10, such as the processor 12, of an example embodiment may perform a comparable analysis additionally or alternatively with respect to the speed associated with the lower speed cluster.

Once the higher speed and the lower speed have been associated with respective ones of the diverging downstream road segments, the lanes of the upstream road segment that correspond to the downstream road segments, such as by most directly feeding into or otherwise being effected by the traffic along the downstream road segments, may also be associated with the higher speed and the lower speed in the same manner as the corresponding downstream road segments. For example, in an instance in which an exit lane diverges to the right of a roadway, the right lane corresponds to the exit lane since the right lane will be most effected by the traffic along the exit lane. Thus, right lane of the upstream road segment and the exit lane may be associated with the same one of the higher or lower speeds, namely, the lower speed. Conversely, the left lane of the upstream road segment corresponds to the downstream road segment that continues past the exit lane since the left lane will feed into the downstream road segment that continues onward past the exit lane. Thus, the left lane of the upstream road segment and the downstream road segment that continues onward past the exit lane may be associated with the same one of the higher and lower speeds, namely, the higher speed.

The apparatus 10 of an example embodiment, such as the processor 12, the communication interface 16, the user interface 18 or the like, may also be configured to cause notification of the bi-modality condition to be provided, such as via a navigation system. See block 28 of FIG. 2. Although the notification may be provided in various manners, the apparatus, such as the processor, the communication interface, the user interface or the like, of an example embodiment may be configured to cause notification of the bi-modality condition to be provided by causing indicia of the higher speed and the lower speed to be provided, such as displayed, in association with the diverging downstream road segments as well as the links of the lanes of the upstream road segment that are associated with the respective downstream road segments.

The speed that is displayed or that is otherwise subject to notification may be the average speed for a lane of the road segment upstream of the diverging downstream road segments as well as the diverging downstream road segments. In an example embodiment, the average speed is a weighted average based on the length of each link and the downstream road segment that are determined to be impacted by the bi-modality condition. Alternatively, the speed that is displayed or otherwise subject to notification may be presented on a link-level so as to separately identify the speed associated with each link of each line. As such, the apparatus 10, such as the processor 12, may provide various degrees granularity with respect to the presentation of the speeds associated with the different links of the lanes along the road segment upstream of the diverging downstream road segment.

The higher speed and the lower speed as well as the diverging downstream segments and the links of the lanes of the upstream road segment associated with each of the higher speed and the lower speed may be provided via the user interface 18 in various manners. In an example embodiment, the apparatus 10, such as the processor 12, publishes the traffic information to a client over an application programming interface (API) utilizing, for example, any of various publishing protocols, such as a dynamic location referencing (DLR) protocol, a universal location referencing (ULR) protocol or an open location referencing (LR) protocol so as to permit the client to map the traffic information to the appropriate location on their own map.

The provision of the higher speed and the lower speed in association with the links of the lanes of the upstream road segment and the diverging downstream road segments may be provided in various manner, such as by providing numerical indications of the higher or lower speed in association with the various links of the lanes of the upstream road segments or by depicting the various links of the lanes of the upstream road segment in different colors, such as red for slower traffic and green for faster traffic. In response to notification, the user may reposition their vehicle appropriately or at least may otherwise be provided with advance notice of the traffic condition upstream of the diverging downstream road segments. Alternatively, an autonomous vehicle may determine to change lanes automatically in response to the notification. In addition, the routing algorithm may take into account the bi-modality condition and may cause the route to be re-routed to avoid a bi-modality condition, such as in instances in which the bi-modality condition is anticipated to slow the travel to such an extent that another route is more advantageous. Regardless, the estimated time of arrival may be more accurately predicted by taking into account the bi-modality condition that has been identified along the route of the vehicle. As the apparatus 10, such as the processor 12, is configured to identify the bi-modality condition and the extent of the bi-modality condition in real time or near real time and, in at least some embodiments, the existence of a bi-modality condition and the extent of bi-modality condition maybe repeatedly updated so as to provide current information to the various vehicles.

FIG. 2 illustrates a flowchart of an apparatus, method and computer program product according to example embodiments of the invention. It will be understood that each block of the flowcharts, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of a navigation system to identify a bi-modality condition, the method comprising:
    determining, with a processor of the navigation system, a distribution of speeds associated with a plurality of probe points representative of travel along a road segment upstream of diverging downstream road segments;
    evaluating, with the processor of the navigation system, the distribution so as to cluster the speeds associated with the plurality of probe points into a higher speed cluster associated with a higher speed and a lower speed cluster associated with a lower speed;
    identifying, with the processor of the navigation system, the bi-modality condition upstream of the diverging downstream road segments based upon a relationship between the higher speed and the lower speed, wherein identifying the bi-modality condition comprises determining a difference between the higher speed and the lower speed, determining a magnitude of bi-modality based upon the difference and identifying the bi-modality condition based upon a comparison of the magnitude of bi-modality to a predefined threshold;
    determining, with the processor of the navigation system, an extent of the bi-modality condition upstream of the diverging downstream road segments;
    causing a notification of the bi-modality condition to be provided by the navigation system; and
    predicting, with the processor of the navigation system, an estimated time of arrival that takes into account the bi-modality condition.

2. A method according to claim 1 wherein the road segment upstream of the diverging downstream road segments comprises a plurality of links, and wherein determining the extent of the bi-modality condition comprises determining one or more links for which the bi-modality condition exists.

3. A method according to claim 2 wherein determining one or more links for which the bi-modality condition exists comprises including each link of the road segment upstream of the diverging downstream road segments until a predefined number of consecutive links fail to satisfy the bi-modality condition.

4. A method according to claim 2 wherein determining the distribution of speeds, evaluating the distribution and identifying the bi-modality condition upstream of the diverging downstream road segments are performed individually for each of the plurality of links.

5. A method according to claim 1 further comprising causing a notification of the bi-modality condition to be provided.

6. A method according to claim 5 wherein causing the notification of the bi-modality condition to be provided comprises causing the higher speed and the lower speed to be provided in association with links of the road segment upstream of the diverging downstream road segments.

7. A method according to claim 1 wherein determining the magnitude of bi-modality comprises
    normalizing the difference based upon a range of the distribution to determine the magnitude of bi-bimodality.

8. A navigation system comprising at least one processor and at least one memory including computer program code, the at least one memory and computer program code configured to, with the processor, to perform each of the following:

determine a distribution of speeds associated with a plurality of probe points representative of travel along a road segment upstream of diverging downstream road segments;

evaluate the distribution so as to cluster the speeds associated with the plurality of probe points into a higher speed cluster associated with a higher speed and a lower speed cluster associated with a lower speed;

identify a bi-modality condition upstream of the diverging downstream road segments based upon a relationship between the higher speed and the lower speed;

determine an extent of the bi-modality condition upstream of the diverging downstream road segments; and     cause a notification of the bi-modality condition to be provided,     wherein the at least one memory and computer program code are configured to, with the processor, cause the navigation system to identify the bi-modality condition by determining a difference between the higher speed and the lower speed, determining a magnitude of bi-modality based upon the difference and identifying the bi-modality condition based upon a comparison of the magnitude of bi-modality to a predefined threshold.

9. A navigation system according to claim 8 wherein the road segment upstream of the diverging downstream road segments comprises a plurality of links, and wherein the at least one memory and the computer program code are configured to, with the processor, cause the navigation system to determine the extent of the bi-modality condition by determining one or more links for which the bi-modality condition exists.

10. A navigation system according to claim 9 wherein the at least one memory and the computer program code are configured to, with the processor, cause the navigation system to determine one or more links for which the bi-modality condition exists by including each link of the road segment upstream of the diverging downstream road segments until a predefined number of consecutive links fail to satisfy the bi-modality condition.

11. A navigation system according to claim 9 wherein the at least one memory and the computer program code are configured to, with the processor, cause the navigation system to determine the distribution of speeds, evaluate the distribution and identify the bi-modality condition upstream of the diverging downstream road segments individually for each of the plurality of links.

12. A navigation system according to claim 8 wherein the at least one memory and the computer program code are further configured to, with the processor, cause the navigation system to cause a notification of the bi-modality condition to be provided.

13. A navigation system according to claim 12 wherein the at least one memory and the computer program code are configured to, with the processor, cause the navigation system to cause the notification of the bi-modality condition to be provided by causing the higher speed and the lower speed to be provided in association with links of the road segment upstream of the diverging downstream road segments.

14. A navigation system according to claim 8 wherein the at least one memory and the computer program code are configured to, with the processor, cause the navigation system to determine the magnitude of bi-modality by normalizing the difference based upon a range of the distribution to determine the magnitude of bi-bimodality; and     identifying the bi-modality condition based upon a comparison of the magnitude of bi-modality to a predefined threshold.

15. A computer program product of a navigation system configured to identify a bi-modality condition, the computer program product comprising at least one non-transitory computer-readable storage medium having computer-executable program code portions stored therein, the computer-executable program code portions comprising program code instructions configured, upon execution by the navigation system, to:

determine a distribution of speeds associated with a plurality of probe points representative of travel along a road segment upstream of diverging downstream road segments;

evaluate the distribution so as to cluster the speeds associated with the plurality of probe points into a higher speed cluster associated with a higher speed and a lower speed cluster associated with a lower speed;

identify a bi-modality condition upstream of the diverging downstream road segments based upon a relationship between the higher speed and the lower speed;

determine an extent of the bi-modality condition upstream of the diverging downstream road segments; and     cause a notification of the bi-modality condition to be provided,     wherein the program code instructions configured to identify the bi-modality condition comprise program code instructions configured to determine a difference between the higher speed and the lower speed, normalize the difference based upon a range of the distribution to determine a magnitude of bi-bimodality and identify the bi-modality condition based upon a comparison of the magnitude of bi-modality to a predefined threshold.

16. A computer program product according to claim 15 wherein the road segment upstream of the diverging downstream road segments comprises a plurality of links, and wherein the program code instructions configured to determine the extent of the bi-modality condition comprise program code instructions configured to determine one or more links for which the bi-modality condition exists.

17. A computer program product according to claim 16 wherein the program code instructions configured to determine one or more links for which the bi-modality condition exists comprise program code instructions configured to include each link of the road segment upstream of the diverging downstream road segments until a predefined number of consecutive links fail to satisfy the bi-modality condition.

18. A computer program product according to claim 16 wherein the program code instructions configured to determine the distribution of speeds, the program code instructions configured to evaluate the distribution and the program code instructions configured to identify the bi-modality condition upstream of the diverging downstream road segments are performed individually for each of the plurality of links.

19. A computer program product according to claim 15 wherein the computer-executable program code portions further comprise program code instructions configured to cause a notification of the bi-modality condition to be provided.

* * * * *